United States Patent
Kwon et al.

(10) Patent No.: US 10,062,906 B2
(45) Date of Patent: Aug. 28, 2018

(54) ELECTRODE HAVING ENHANCED ADHESION FOR LITHIUM SECONDARY BATTERIES

(71) Applicant: LG Chem, Ltd., Seoul (KR)

(72) Inventors: JiYoon Kwon, Daejeon (KR); KyoungHo Kim, Daejeon (KR); Cheolhoon Choi, Daejeon (KR); HoeJin Hah, Daejeon (KR); Seok Koo Kim, Daejeon (KR); Jooyong Song, Daejeon (KR)

(73) Assignee: LG Chem, Ltd. (KR)

( * ) Notice: Subject to any disclaimer, the term of this patent is extended or adjusted under 35 U.S.C. 154(b) by 220 days.

(21) Appl. No.: 14/872,242

(22) Filed: Oct. 1, 2015

(65) Prior Publication Data
US 2016/0099470 A1  Apr. 7, 2016

(30) Foreign Application Priority Data
Oct. 6, 2014 (KR) .................. 10-2014-0134200

(51) Int. Cl.
*H01M 4/62* (2006.01)
*H01M 4/134* (2010.01)
(Continued)

(52) U.S. Cl.
CPC ......... *H01M 4/622* (2013.01); *H01M 4/0404* (2013.01); *H01M 4/134* (2013.01);
(Continued)

(58) Field of Classification Search
CPC .......... H01M 10/0525; H01M 4/0404; H01M 4/0435; H01M 4/134; H01M 4/1395; H01M 4/366
See application file for complete search history.

(56) References Cited

U.S. PATENT DOCUMENTS

2006/0275661 A1* 12/2006 Kim .................. C08F 220/18
  429/217
2010/0330430 A1* 12/2010 Chung .................. H01M 4/40
  429/224

(Continued)

FOREIGN PATENT DOCUMENTS

JP  2013042053 A  2/2013
JP  2013131381 A  7/2013

OTHER PUBLICATIONS

Machine Translation of: Morita et al. (JP 2013-131381A), Jul. 4, 2013.*

*Primary Examiner* — Kenneth J Douyette
(74) *Attorney, Agent, or Firm* — Lerner, David, Littenberg, Krumholz & Mentlik, LLP

(57) ABSTRACT

Disclosed is an electrode for secondary batteries including an electrode mix, which includes an electrode active material and a binder, coated on a current collector. More particularly, the electrode includes a first electrode mix layer including a first binder, a glass transition temperature (Tg) of which is lower than that of a second binder, and an electrode active material, and coated on the current collector; and a second electrode mix layer including the second binder, a glass transition temperature (Tg) of which is higher than that of the first binder, and an electrode active material, and coated on the first electrode mix layer.

18 Claims, 1 Drawing Sheet

(51) Int. Cl.
  *H01M 4/38* (2006.01)
  *H01M 4/04* (2006.01)
  *H01M 10/0525* (2010.01)
  *H01M 4/1395* (2010.01)
  *H01M 4/36* (2006.01)
  *H01M 4/02* (2006.01)

(52) U.S. Cl.
  CPC ......... *H01M 4/1395* (2013.01); *H01M 4/366* (2013.01); *H01M 4/386* (2013.01); *H01M 10/0525* (2013.01); *H01M 4/0435* (2013.01); *H01M 2004/027* (2013.01); *H01M 2220/10* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 2012/0177990 A1* | 7/2012 | Mitsuhashi | H01M 4/362 429/211 |
| 2013/0040206 A1* | 2/2013 | Yoshida | H01M 2/145 429/307 |
| 2014/0023921 A1* | 1/2014 | Lee | H01M 4/13 429/211 |

* cited by examiner

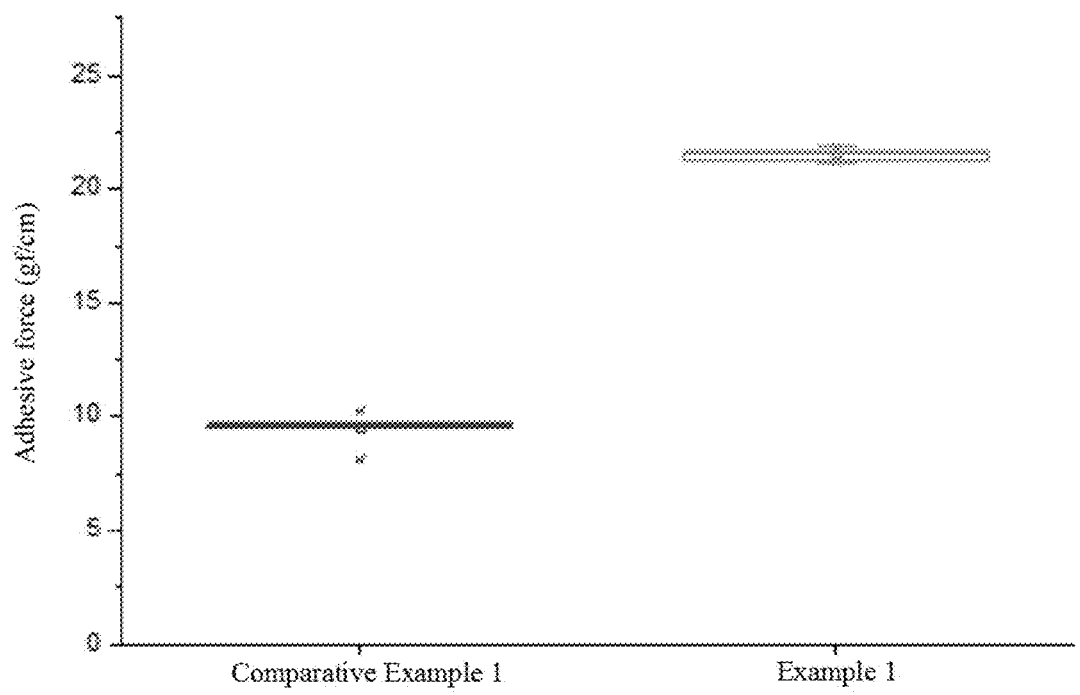

ELECTRODE HAVING ENHANCED ADHESION FOR LITHIUM SECONDARY BATTERIES

CROSS-REFERENCE TO RELATED APPLICATIONS

This application claims the benefit of Korean Patent Application No. 10-2014-0134200 filed on Oct. 6, 2014 with the Korean Intellectual Property Office, the disclosure of which is herein incorporated by reference in its entirety.

TECHNICAL FIELD

The present invention relates to an electrode for lithium secondary batteries.

BACKGROUND ART

As technology for mobile devices and demand therefor continue to increase, demand for secondary batteries as energy sources is rapidly increasing. Among secondary batteries, lithium secondary batteries having high energy density and voltage are commercially available. In general, such lithium secondary batteries use a lithium transition metal oxide as a positive electrode active material and a graphite-based material as a negative electrode material. Charge and discharge thereof are performed by repeating a process wherein lithium ions of a positive electrode are intercalated into and deintercalated from a negative electrode.

Even though there is a difference in the theoretical capacity of the battery depending upon kinds of electrode active materials, charge/discharge capacity of a battery generally decreases as the number of charge/discharge cycles increases. The primary cause of such a phenomenon is a failure to sufficiently fulfill functions of the electrode active material due to inner resistance increased by separation between the electrode active materials and/or between the electrode active material and current collector, resulting from volume changes of electrodes occurring during repeated charge/discharge cycles of the battery. Further, since the lithium ions intercalated into the negative electrode are not normally released from the negative electrode during intercalation and deintercalation, the active points of the negative electrode are decreased as the number of charge/discharge cycles increases. Consequently, further increase in the number of charge/discharge cycles also leads to decrease of the charge/discharge capacity and deterioration of lifespan characteristics in the battery.

In particular, when a silicon (Si)-based active material having a high theoretical capacity of 3580 mAh/g at room temperature is used as an active material discharge capacity, the volume of the material is remarkably increased by about 300% according to progression of charge and discharge, and thus, an electrode mix is released from a current collector. Accordingly, battery capacity is rapidly decreased after several to several dozens of cycle numbers.

Accordingly, there is an urgent need for an electrode mix which may provide binding strength enhancement to a current collector and thus performance enhancement of a battery by controlling volumetric expansion of an electrode active material occurring during repeated charge/discharge. Accordingly, there have been many attempts in regard to an active material preparation method, such as a method of constituting an alloy with a metal such as tin, a method of reducing a ratio of silicon while maintaining a SiO shape and preparing a buffer layer, or the like.

However, in spite of such various technical attempts, there is still volumetric change, and heavy contact loss occurs between active materials with increasing cycle number. Accordingly, an electrode mix exhibiting desired properties has not yet developed.

Therefore, there is an urgent need to develop an electrode mix having superior adhesion which may enhance cycle characteristics of a battery by imparting structural stability to an electrode while having high theoretical capacity.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when an electrode is manufactured using binders having different glass transition temperatures (Tg) near an interface of a current collector and in an electrode mix on the current collector and a secondary battery is manufactured using the manufactured electrode, high adhesion is exhibited between the current collector and an active material and between active materials, and electron migration pathway loss in an active material due to volumetric change according to an increasing cycle number may be minimized, thus completing the present invention.

Technical Solution

In accordance with one aspect of the present invention, provided is an electrode for secondary batteries including an electrode mix, which includes an electrode active material and a binder, coated on a current collector, the electrode including:

a first electrode mix layer including a first binder, a glass transition temperature (Tg) of which is lower than that of a second binder, and an electrode active material, and coated on the current collector; and a second electrode mix layer including the second binder, a glass transition temperature (Tg) of which is higher than that of the first binder, and an electrode active material, and coated on the first electrode mix layer.

In accordance with another aspect of the present invention, provided is an electrode for secondary batteries including an electrode mix, which includes an electrode active material and a binder, coated on a current collector, the electrode including:

a primer coating layer including a first binder, a glass transition temperature (Tg) of which is lower than that of a second binder, and a conductive material, and coated on the current collector; and an electrode mix layer including the second binder, a glass transition temperature (Tg) of which is higher than that of the first binder, and an electrode active material, and coated on the primer coating layer.

Conventionally, upon manufacturing an electrode mix, a single-layer binder was used regardless of the distance of an interface of a current collector. Accordingly, when a high loading material is used as an electrode active material, volumetric change of an active material increases due to repeated charge and discharge as described above and thus adhesion is rapidly decreased, whereby electron migration pathways of an active material are decreased and overall battery capacity is decreased.

Accordingly, as a result of a variety of extensive and intensive studies and experiments, the inventors of the present invention confirmed that, when binders having a different glass transition temperature (Tg) are used in an area near an interface of the current collector and an electrode mix on the current collector as described above, adhesion decrease in the electrode mix may be prevented due to a binder exhibiting enhanced adhesion in spite of volumetric change of an active material.

In particular, in a binder having a relatively high glass transition temperature, adhesion between a current collector and an active material is decreased, but adhesion between active materials may be enhanced. On the other hand, when a glass transition temperature is relatively low, adhesion between a current collector and an active material may be enhanced. Accordingly, the electrode according to the present invention may be composed using a binder with a relatively high glass transition temperature as a second binder being far from a current collector and a binder having a relatively low glass transition temperature as the first binder being near a current collector.

The glass transition temperature (Tg) of each of the first binder and the second binder is not specifically limited so long as the glass transition temperature (Tg) of the first binder differs from the glass transition temperature (Tg) of the second binder. The glass transition temperature (Tg) of the first binder may be particularly −15° C. or more to 15° C. or less, and, in particular, the glass transition temperature (Tg) of the second binder may be 10° C. or more higher than the glass transition temperature of the first binder. More particularly, the glass transition temperature (Tg) of the second binder may be 10° C. to less than 25° C. in the range that the glass transition temperature (Tg) of the second binder is higher than that of the first binder.

With increasing glass transition temperature of the second binder, adhesion between active materials may be enhanced. However, when the glass transition temperature is 25° C. or more, problems may occur during an electrode molding process due to brittleness characteristics. Therefore, the glass transition temperature is preferably 10° C. or more and less than 25° C.

The first binder and the second binder may be the same compound. When the first binder and the second binder are the same compound, the first binder and the second binder may have different number average molecular weights to have different glass transition temperatures. With increasing number average molecular weight, crosslinking increases and thus glass transition temperature may increase. Accordingly, the number average molecular weight of the first binder may be smaller than that of the second binder.

In addition, the first binder may differ from the second binder, and the first binder and the second binder are not specifically limited so long as the glass transition temperature range is satisfied. In particular, the first binder may be a polymer of monomers including a styrene monomer (SM) and butyl acrylate (BA), and the second binder may be a polymer of monomers including a styrene monomer (SM) and butadiene (BD).

Hereinafter, electrodes for secondary batteries composed of the two compositions are respectively described in detail.

First, in regard to an electrode for secondary batteries including the first electrode mix layer and the second electrode mix layer, the thickness of the first electrode mix layer may be particular 10 to 90%, more particularly 30 to 70%, the thickness of the second electrode mix layer. Since the second electrode mix layer includes the second binder providing relatively high adhesion between active materials, it is preferable to relatively increase the thickness of the second electrode mix layer to enhance cycle characteristics and rate characteristics due to the second binder, as described above.

Here, in the first electrode mix layer, the content of the first binder may be 1 to 15% by weight based on the total weight of the first electrode mix layer, and, in the second electrode mix layer, the content of the second binder may be 1 to 15% by weight based on the total weight of the second electrode mix layer.

Outside this range, when the content of each of the binders is too low, adhesion between the current collector and the active material or between the active materials is decreased and thus it is difficult to accomplish desired effects of the present invention. On the other hand, when the content of each of the binders is too high, electrode resistance increases and thus battery properties are decreased. In addition, the content of the active material and the conductive material is relatively decreased and thus capacity and conductivity of the electrode are decreased.

In addition, in order to enhance conductivity, each of the first electrode mix layer and the second electrode mix layer may further include an electrically conductive material. Here, the content of the conductive materials may be respectively 20 to 100 parts by weight based on 100 parts by weight of the first binder.

Outside this range, when the content of the conductive material is less than 20 parts by weight, desired conductivity might not be obtained, and, when the content of the conductive material is greater than 100 parts by weight, the content of the binder is relatively decreased. Accordingly, electrode adhesion is decreased.

Meanwhile, in an electrode for secondary batteries including the primer coating layer and the electrode mix layer, only the electrode mix layer includes an electrode active material and thus a thickness ratio of the primer coating layer to the electrode mix layer is not specifically limited. Particularly, the thickness of the primer coating layer may be 0.1 to 3.0 μm.

When the thickness of the primer coating layer is less than 0.1 μm, it is difficult to uniformly manufacture the first binder layer that may enhance adhesion between the current collector and the electrode mix layer. When the thickness of the primer coating layer is greater than 3.0 μm, the amount of the electrode mix layer including the active material is relatively decreased and thus capacity is decreased, whereby the a primer coating layer may function as resistance.

Here, the content of the first binder in the primer coating layer may be 50 to 85% by weight based on a total weight of the primer coating layer, and the content of the second binder in the electrode mix layer may be 1 to 15% by weight based on the total weight of an electrode mix layer.

Outside this range, when the content of each of the binders is too low, adhesion between the current collector and the active material or between the active materials is decreased and thus it is difficult to accomplish desired effects of the present invention. On the other hand, when the content of each of the binders is too high, resistance in an electrode increases and thus battery properties are decreased. In addition, with decreasing active material and conductive material contents, capacity and conductivity of the electrode are decreased.

Furthermore, since the primer coating layer does not include the active material, proper adhesion may be exhibited even when a relatively small amount of the binder is used as described above.

In addition, the primer layer may further include an electrically conductive material to enhance conductivity between the current collector and the electrode mix layer. Here, the content of the conductive material may be 20 to 100 parts by weight based on 100 parts by weight of the first binder.

Outside this range, when the content of the conductive material is less than 20 parts by weight, desired conductivity might not be obtained. When the content of conductive material is greater than 100 parts by weight, the content of the binder is relatively decreased and thus electrode adhesion is decreased.

The electrode active material of the first electrode mix layer may be the same as or different from the electrode active material of the second electrode mix layer. In particular, the electrode active material of the first electrode mix layer may be the same as the electrode active material of the second electrode mix layer.

When the electrode for secondary batteries is a positive electrode, the electrode active material may include, as a positive electrode active material, for example, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having Formula $LiNi_{1-x}M_xO_2$ where M=Co, Mn, Al, Cu, Fe, Mg, B, or Ga, and $0.01 \leq x \leq 0.3$; lithium manganese composite oxides having Formula $LiMn_{2-x}M_xO_2$ where M=Co, Ni, Fe, Cr, Zn, or Ta, and $0.01 \leq x \leq 0.1$ or Formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some Li atoms are substituted with alkaline earth metal ions; disulfide compounds; and $Fe_2(MoO_4)_3$, but the present invention is not limited thereto.

On the other hand, when the electrode for secondary batteries is a negative electrode, the electrode active material may include, as a negative electrode active material, at least one carbon-based material selected from the group consisting of, for example, artificial crystalline graphite, natural crystalline graphite, amorphous hard carbon, low-crystalline soft carbon, carbon black, acetylene black, Ketjen black, Super-P, graphene and fibrous carbon; Si-based materials; metal composite oxides such as $Li_xFe_2O_3$ where $0 \leq x \leq 1$, $Li_xWO_2$ where $0 \leq x \leq 1$, $Sn_xMe_{1-x}Me'_yO$, where Me: Mn, Fe, Pb, or Ge; Me': Al, B, P, Si, Group I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides, etc., but the present invention is not limited thereto.

However, since, upon charge/discharge, an active material having large volumetric change is used in the electrode for secondary batteries according to the present invention, the electrode is more suitable for a battery in which low adhesion between a current collector and an active material or between active materials is exhibited. In particular, the electrode for secondary batteries is a negative electrode, the electrode active material may include a Si-based material, and the Si-based material may be one or more selected from the group consisting of $SiO_x$, where $0.5 \leq x \leq 2$, Si alloy, amorphous Si, etc. In the case of Si alloy, a metal composed of alloy including Si is one or more metals selected from the group consisting of Mg, Al, Fe, Ni, Cu and Ga.

Accordingly, the electrode for secondary batteries according to the present invention is a high loading electrode having a high theoretical capacity and prevents adhesion decrease. Accordingly, even when cycle number increases, adhesion between a current collector and an active material and between active materials is maintained and thus loss of an electron migration pathway of an active material may be minimized.

Meanwhile, a current collector of the electrode for secondary batteries according to the present invention has a thickness of 3 to 500 μm. The current collector is not particularly limited so long as it does not cause chemical changes in the fabricated battery and has conductivity. For example, the negative electrode current collector may be made of copper, stainless steel, aluminum, nickel, titanium, sintered carbon or aluminum surface-treated with carbon, nickel, titanium, or silver, and aluminum-cadmium alloys. The current collector may also have fine irregularities at a surface thereof to enhance adhesion between the current collector and the electrode active material and may be used in various forms including films, sheets, foils, nets, porous structures, foams, and non-woven fabrics.

Meanwhile, as described above, the electrode mix layer may further include, as needed, materials such as a conductive material, etc.

There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. Examples of a commercially available conductive material include acetylene black manufactured by Chevron Chemical, Denka black manufactured by Denka Singapore private limited, products manufactured by Gulf Oil, Ketjen black, EC series manufactured by Armak, Vulcan XC-72 manufactured by Cabot, and Super P manufactured by Timcal, etc.

As needed, a filler as an ingredient inhibiting swelling of an electrode may be selectively added. The filler is not particularly limited so long as it is a fibrous material that does not cause chemical changes in the fabricated battery. Examples of the filler include olefin based polymers such as polyethylene and polypropylene; and fibrous materials such as glass fiber and carbon fiber.

In addition, an ingredient such as a viscosity control agent or an adhesion promoter, or a combination of two or more thereof may be selectively further included.

The viscosity control agent is an ingredient for controlling the viscosity of an electrode mix so as to facilitate a mixing process of an electrode mix and a process of spreading the same over a collector and may be added in an amount of maximally 30 wt % based on the total weight of the electrode mix. Examples of such a viscosity control agent include carboxymethylcellulose, polyvinylidene fluoride, and the like, but the present invention is not limited thereto.

In some cases, the solvents described above may also function as the viscosity control agent.

The adhesion promoter is an auxiliary component added to enhance adhesion between an electrode active material and an electrode current collector and may be added in an amount of 10 wt % or less based on the amount of the binder. Examples of the adhesion promoter include, without being limited to, oxalic acid, adipic acid, formic acid, acrylic acid derivatives, and itaconic acid derivatives.

Meanwhile, the present invention provides a method of manufacturing the electrode for secondary batteries according to the present invention.

First, a method of manufacturing the electrode for secondary batteries including the first electrode mix layer and the second electrode mix layer according to the present invention may, for example, include:

(i) forming a first electrode mix layer by drying after spreading a slurry including a first binder and an electrode active material on a current collector;

(ii) forming a second electrode mix layer by drying after spreading a slurry including a second binder and an electrode active material on the first electrode mix layer; and (iii) drying and rolling the first electrode mix layer and the second electrode mix layer.

Meanwhile, a method of manufacturing the electrode for secondary batteries including the primer coating layer and the electrode mix layer according to the present invention may, for example, include:

(i) forming a primer coating layer by drying after spreading a slurry including a first binder and a conductive material on a current collector;

(ii) forming an electrode mix layer by drying after spreading a slurry including a second binder and an electrode active material on the primer coating layer; and (iii) drying and rolling the primer coating layer and the electrode mix layer.

In addition, the coating, drying and rolling may be carried out without specific limitation according to a method publicly known in the art.

Some processes of the method of manufacturing the electrode according to the present invention may be modified as needed, it should be understood that all modifications are within the scope of the present invention. For example, the drying process may be carried out in a process in which each of the electrode mix layers is formed, and the rolling process may also be carried out in a process in which each of the electrode mix layers is formed.

The present invention also provides a lithium secondary battery including the electrode for a secondary battery.

The lithium secondary battery is composed of an electrode assembly that includes a positive electrode, a negative electrode, and a separator disposed between the positive electrode and the negative electrode, and that is impregnated with a lithium salt-containing non-aqueous electrolyte.

The separator is disposed between the positive electrode and the negative electrode. As the separator, an insulating thin film having high ion permeability and mechanical strength is used. A pore diameter of the separator is typically 0.01 to 10 μm and a thickness thereof is typically 5 to 300 μm. Examples of such a separator include sheets or non-woven fabrics made of an olefin polymer such as polypropylene, glass fibers, or polyethylene, which have chemical resistance and hydrophobicity, Kraft paper, etc.

As needed, a gel polymer electrolyte may be coated on the separator to increase stability of a battery. Representative examples of such a gel polymer include polyethylene oxide, polyvinylidene fluoride, polyacrylonitrile, etc. When a solid electrolyte such as a polymer is used as an electrolyte, the solid electrolyte may also function as a separator.

The electrolyte may be a lithium salt-containing non-aqueous electrolyte, the lithium salt-containing non-aqueous electrolyte is composed of a non-aqueous electrolyte and a lithium salt, and examples of the non-aqueous electrolyte include non-aqueous organic solvents, organic solid electrolytes, inorganic solid electrolytes, etc., but the present invention is not limited thereto.

Examples of the non-aqueous organic solvent include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymerization agents containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

A lithium salt is a material that is readily soluble in the non-aqueous electrolyte and examples thereof include, but are not limited to, $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the lithium salt-containing non-aqueous electrolyte. If necessary, in order to impart incombustibility, the electrolyte may further include halogen-containing solvents such as carbon tetrachloride and ethylene trifluoride. Further, in order to enhance high-temperature storage characteristics, the electrolyte may further include carbon dioxide gas.

In a specific embodiment, a lithium salt-containing non-aqueous electrolyte may be prepared by adding a lithium salt such as $LiPF_6$, $LiClO_4$, $LiBF_4$, or $LiN(SO_2CF_3)_2$ to a mixed solvent including EC or PC, which is a high dielectric solvent and a cyclic carbonate, and DEC, DMC, or EMC, which is a low viscosity solvent and a linear carbonate.

The present invention provides a battery module including the secondary battery as a unit cell, a battery pack including the battery module and a device including the battery pack as a power source.

In particular, the device may be a mobile device, an electric vehicle (EV), a hybrid electric vehicle (HEV) or a plug-in hybrid electric vehicles (plug-in HEV) or an energy storage system, but the present invention is not limited thereto.

Structures and manufacturing methods of the battery module, battery pack and device are publicly known in the art and, thus, detailed description thereof is omitted in the present specification.

Effects of Invention

As apparent from the fore-going, an electrode for secondary batteries according to the present invention exhibits superior rate characteristics, etc. due to application of a high loading electrode and enhanced adhesion at an interface of a current collector and adhesion between active materials due to application of binders having a different glass transition temperatures, whereby electron migration pathway loss in an active material due to volumetric change according to an increasing cycle number may be minimized.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrated a graph comparing initial adhesion of negative electrodes manufactured according to Example 1 and Comparative Example 1.

BEST MODE

Now, the present invention will be described in more detail with reference to the following examples. These examples are provided only for illustration of the present invention and should not be construed as limiting the scope and spirit of the present invention.

Example 1

1-1. Manufacture of First Negative Electrode Mix Slurry

AD-B01 (product name) manufactured by LGC was used as a binder, and Si, carbon black and AD-B01 as a first binder were added in a ratio of 90:5:5 and then input to distilled water, followed by mixing. As a result, a negative electrode mix slurry for preparing a first negative electrode mix layer was prepared.

1-2. Manufacture of Second Negative Electrode Mix Slurry

BML301 (product name) manufactured by Nippon Zeon) was used as a binder, and Si, carbon black and BML301 as a second binder were added in a ratio of 90:5:5 and then input to distilled water, followed by mixing. As a result, a negative electrode mix slurry for preparing a second negative electrode mix layer was prepared.

1-3. Manufacture of Negative Electrode

The first negative electrode mix slurry was coated to a thickness of 20 μm on copper foil as a current collector and then dried. Subsequently, the second negative electrode mix slurry was coated and dried on the first negative electrode mix layer and then rolled, thereby manufacturing a negative electrode having an overall thickness of 80 μm.

Comparative Example 1

The same method as in Example 1 was used, except that a negative electrode having an overall thickness of 80 μm was manufactured using a slurry including only the first binder.

Properties of the binders used in Example 1 and Comparative Example 1 are summarized in Table 1 below.

<Experimental Example 1> Adhesion Comparison and Evaluation

Initial adhesion of each of negative electrodes manufactured according to Example 1 and Comparative Example 1 was measured. Results are summarized in FIG. 1.

TABLE 1

| Manufacturer | Nippon Zeon | LGC |
|---|---|---|
| Product Name | BML301 | AD-B01 |
| Composition | SM | SM |
|  | BD | BA |
|  | BA |  |
| Tg (° C.) | 15 | −6 |

*SM: Styrene Monomer
*BD: Butadiene
*BA: Butyl acrylate

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode for secondary batteries comprising an electrode mix, which comprises an electrode active material and a binder, coated on a current collector, the electrode comprising:
   a first electrode mix layer comprising a first binder, a glass transition temperature (Tg) of which is lower than that of a second binder, and an electrode active material, and coated on the current collector; and
   a second electrode mix layer comprising the second binder, a glass transition temperature (Tg) of which is higher than that of the first binder, and an electrode active material, and coated on the first electrode mix layer,
   wherein
   the electrode is a negative electrode and the electrode active material comprises a Si-based material,
   the glass transition temperature (Tg) of the first binder is −15° C. to 6° C., and
   the glass transition temperature (Tg) of the second binder is 10° C. to 15° C. in the range that the glass transition temperature (Tg) of the second binder is higher than that of the first binder.

2. The electrode according to claim 1, wherein a thickness of the first electrode mix layer is 10 to 90% a thickness of the second electrode mix layer.

3. The electrode according to claim 1, wherein a thickness of the first electrode mix layer is 30 to 70% a thickness of the second electrode mix layer.

4. The electrode according to claim 1, wherein the electrode active material of the first electrode mix layer is the same as the electrode active material of the second electrode mix layer.

5. The electrode according to claim 1, wherein a content of the first binder in the first electrode mix layer is 1 to 15% by weight based on a total weight of the first electrode mix layer, and a content of the second binder in the second electrode mix layer is 1 to 15% by weight based on a total weight of the second electrode mix layer.

6. The electrode according to claim 1, wherein each of the first electrode mix layer and the second electrode mix layer further comprises an electrically conductive material.

7. The electrode according to claim 6, wherein, in each of the first binder and the second binder, a content of the conductive material is 20 to 100 parts by weight based on 100 parts by weight of each of the first binder and the second binder.

8. The electrode according to claim 1, wherein the first binder and the second binder are the same.

9. The electrode according to claim 8, wherein number average molecular weights of the first binder and the second binder are different.

10. The electrode according to claim 1, wherein the first binder is different from the second binder.

11. The electrode according to claim 10, wherein the first binder is a polymer of monomers comprising a styrene monomer (SM) and butyl acrylate (BA).

12. The electrode according to claim 10, wherein the second binder is a polymer of monomers comprising a styrene monomer (SM) and butadiene (BD).

13. A method of manufacturing the electrode for secondary batteries according to claim 1, the method comprising:
    forming a first electrode mix layer by drying after spreading a slurry comprising a first binder and an electrode active material on a current collector;
    forming a second electrode mix layer by drying after spreading a slurry comprising a second binder and an electrode active material on the first electrode mix layer; and
    drying and rolling the first electrode mix layer and the second electrode mix layer.

14. A lithium secondary battery comprising the electrode for secondary batteries according to claim 1.

15. A battery module comprising the lithium secondary battery according to claim 14 as a unit cell.

16. A battery pack comprising the battery module according to claim 15.

17. A device comprising the battery pack according to claim 16 as a power source.

18. The device according to claim 17, wherein the device is an electric vehicle, a hybrid electric vehicle, a plug-in hybrid electric vehicle or an energy storage system.

* * * * *